Patented Nov. 27, 1945

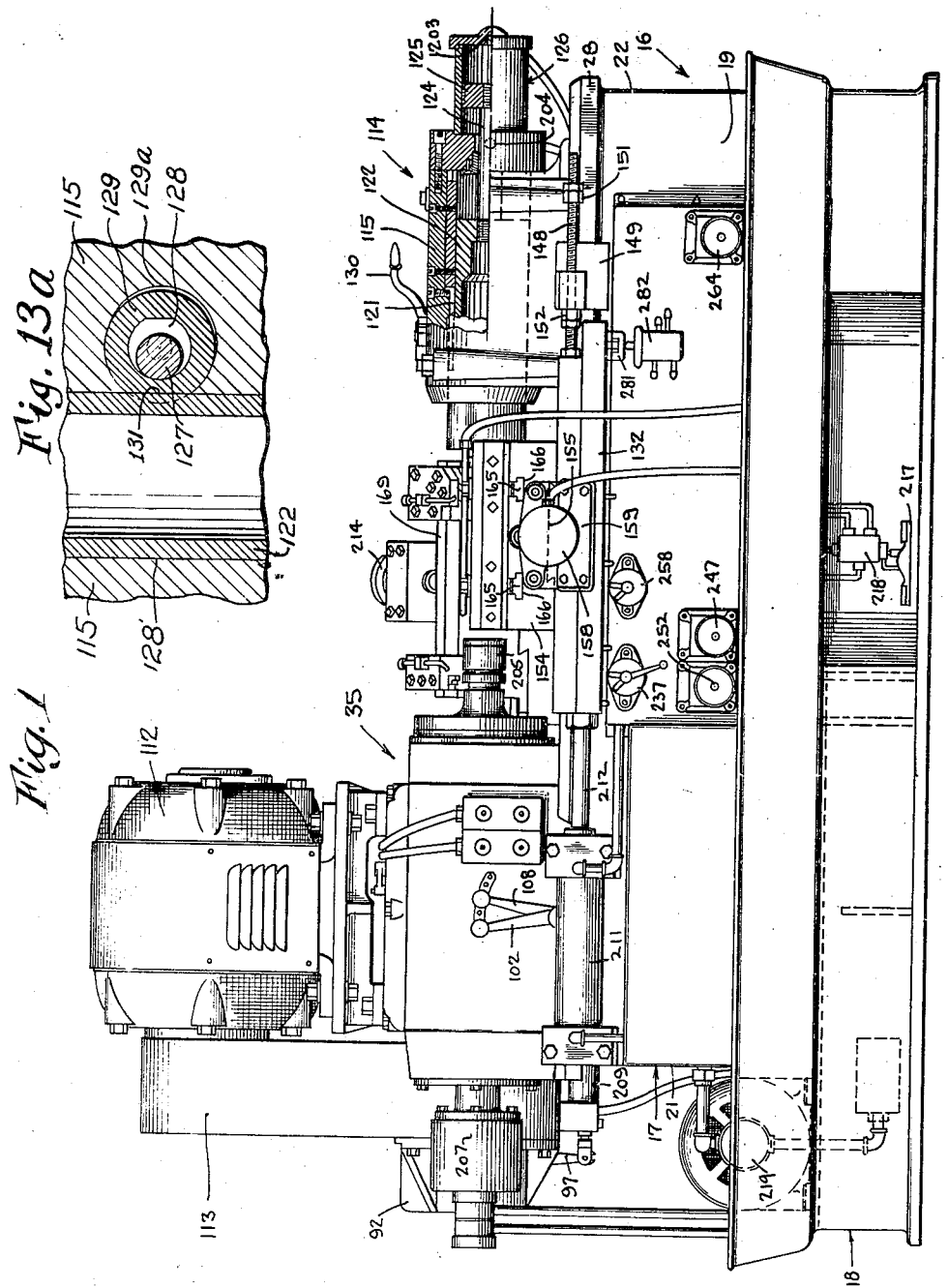

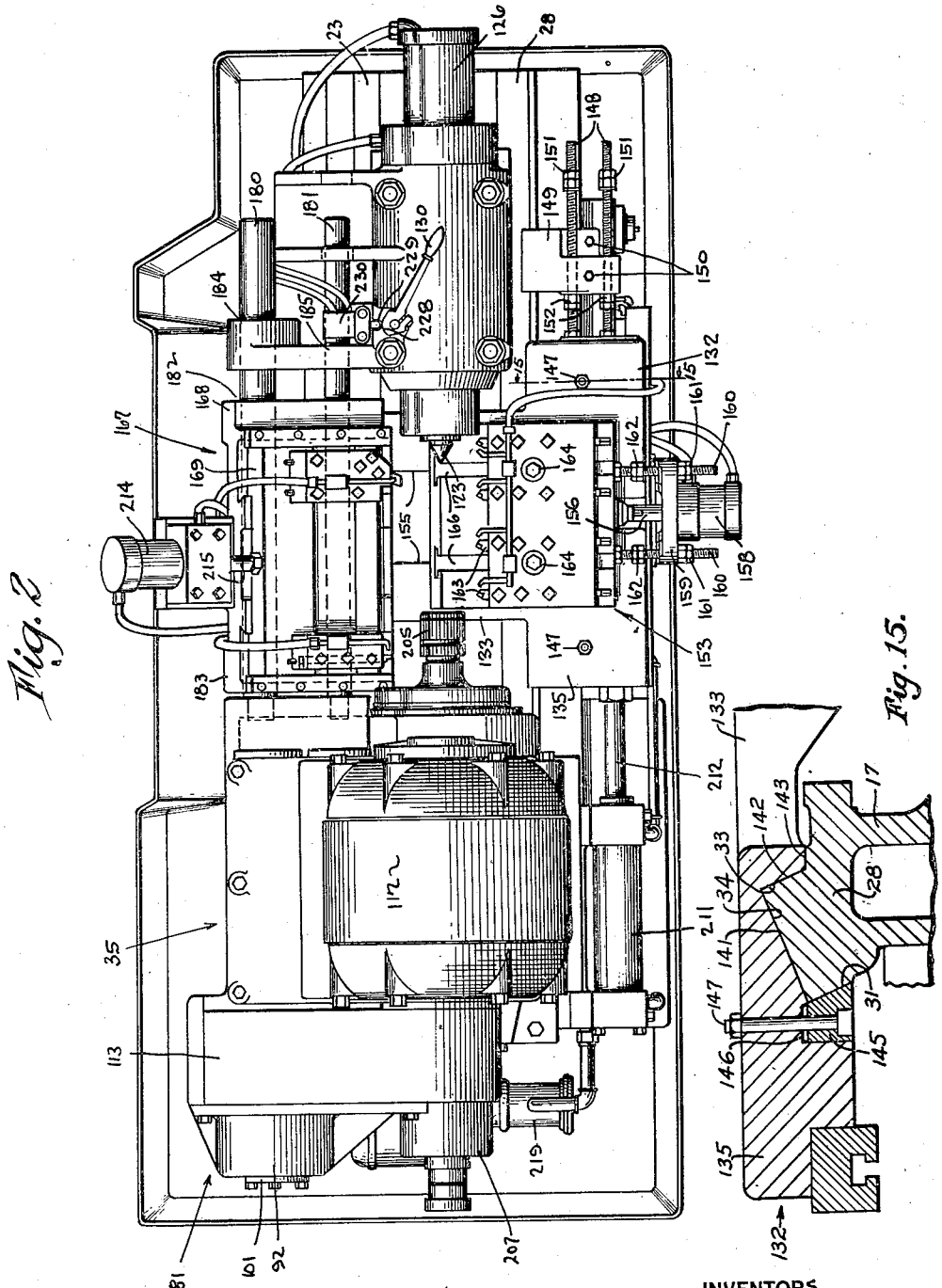

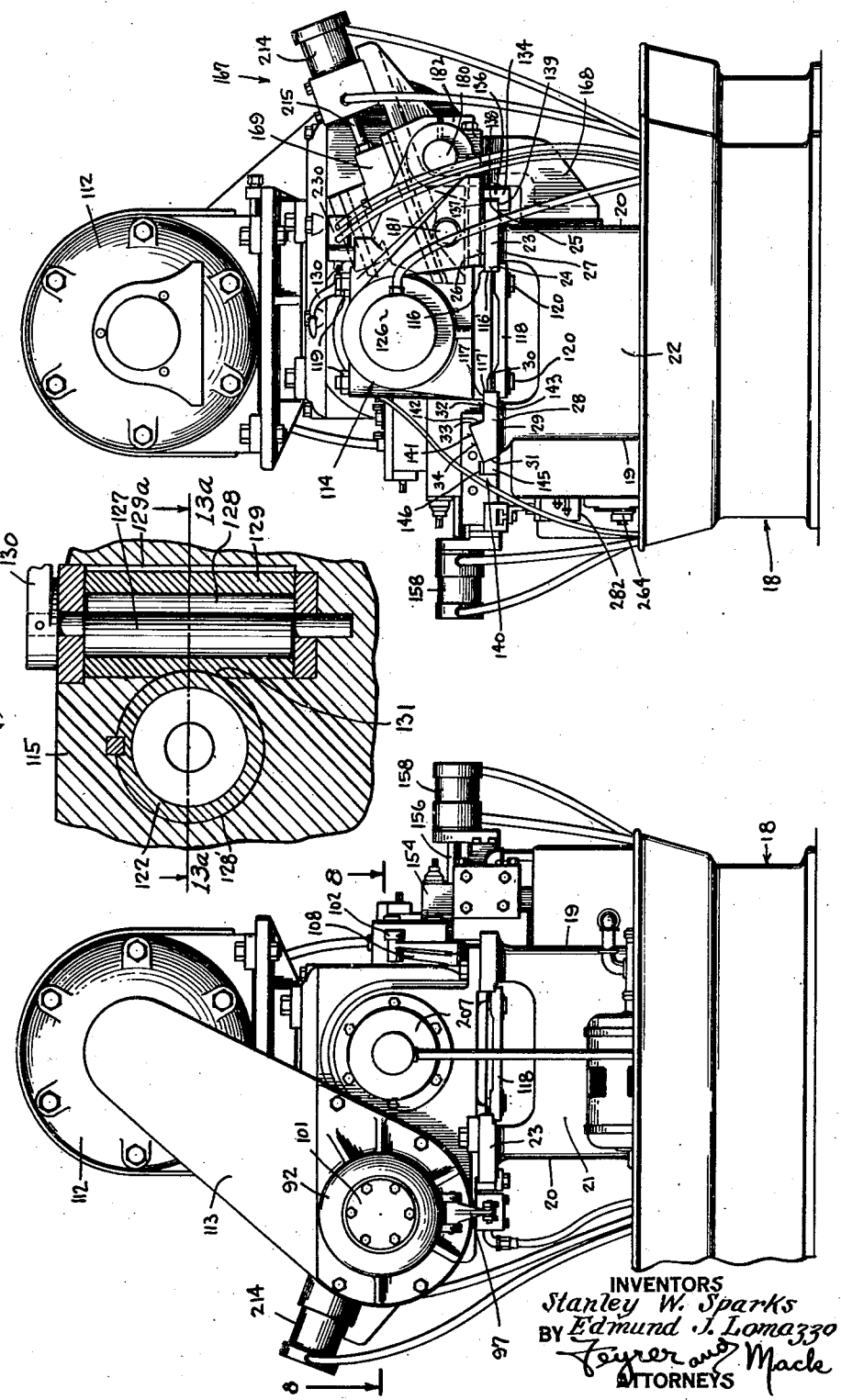

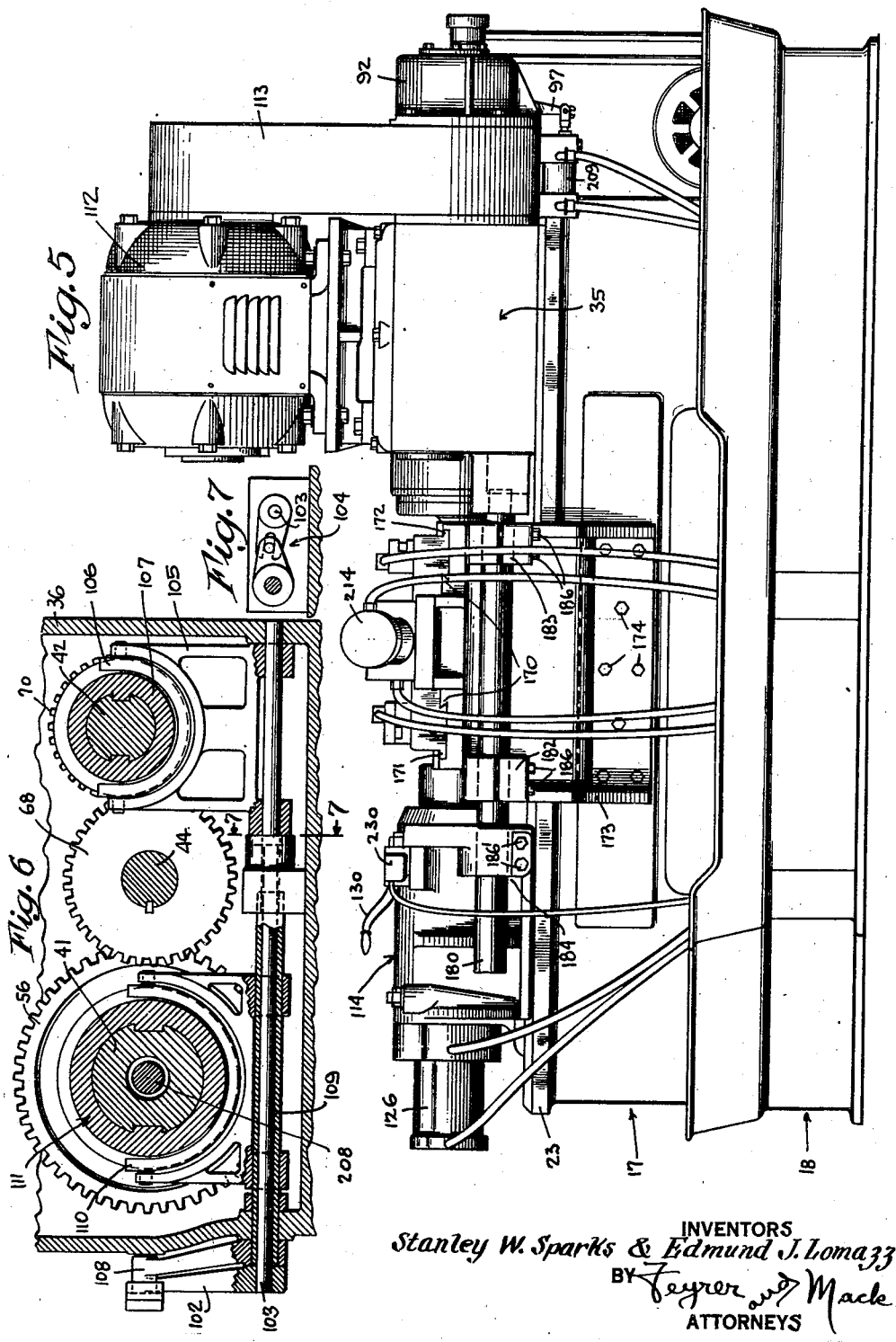

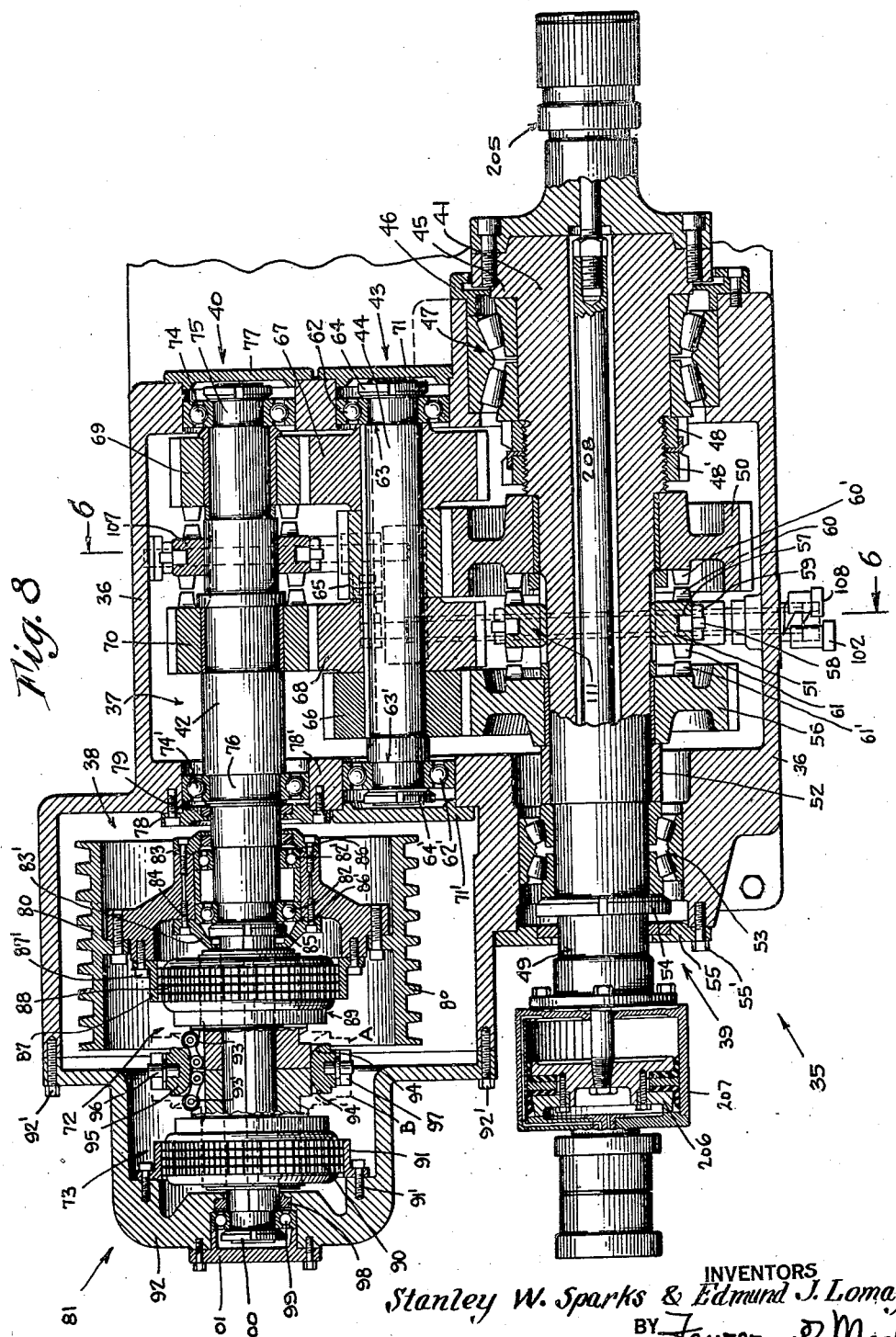

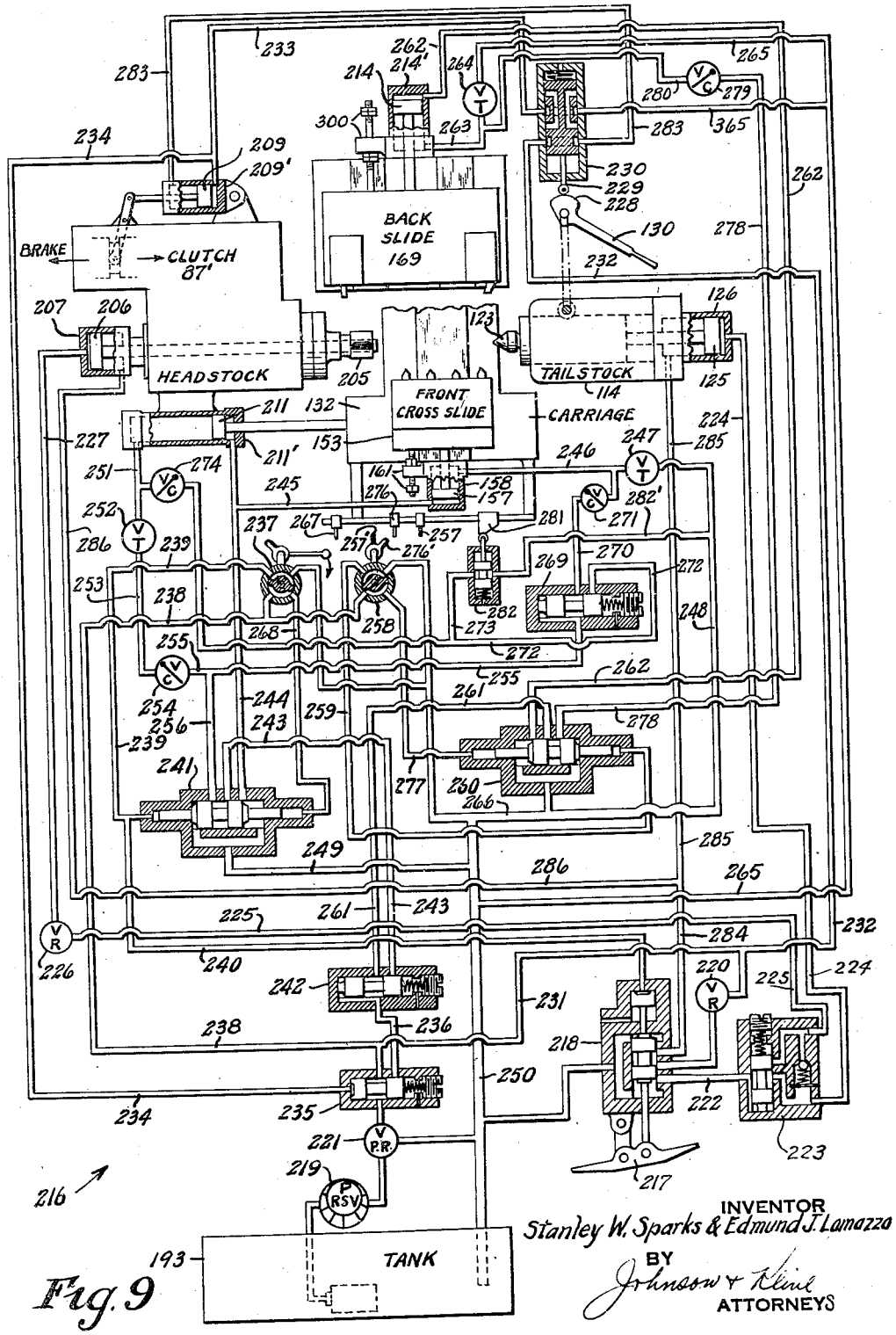

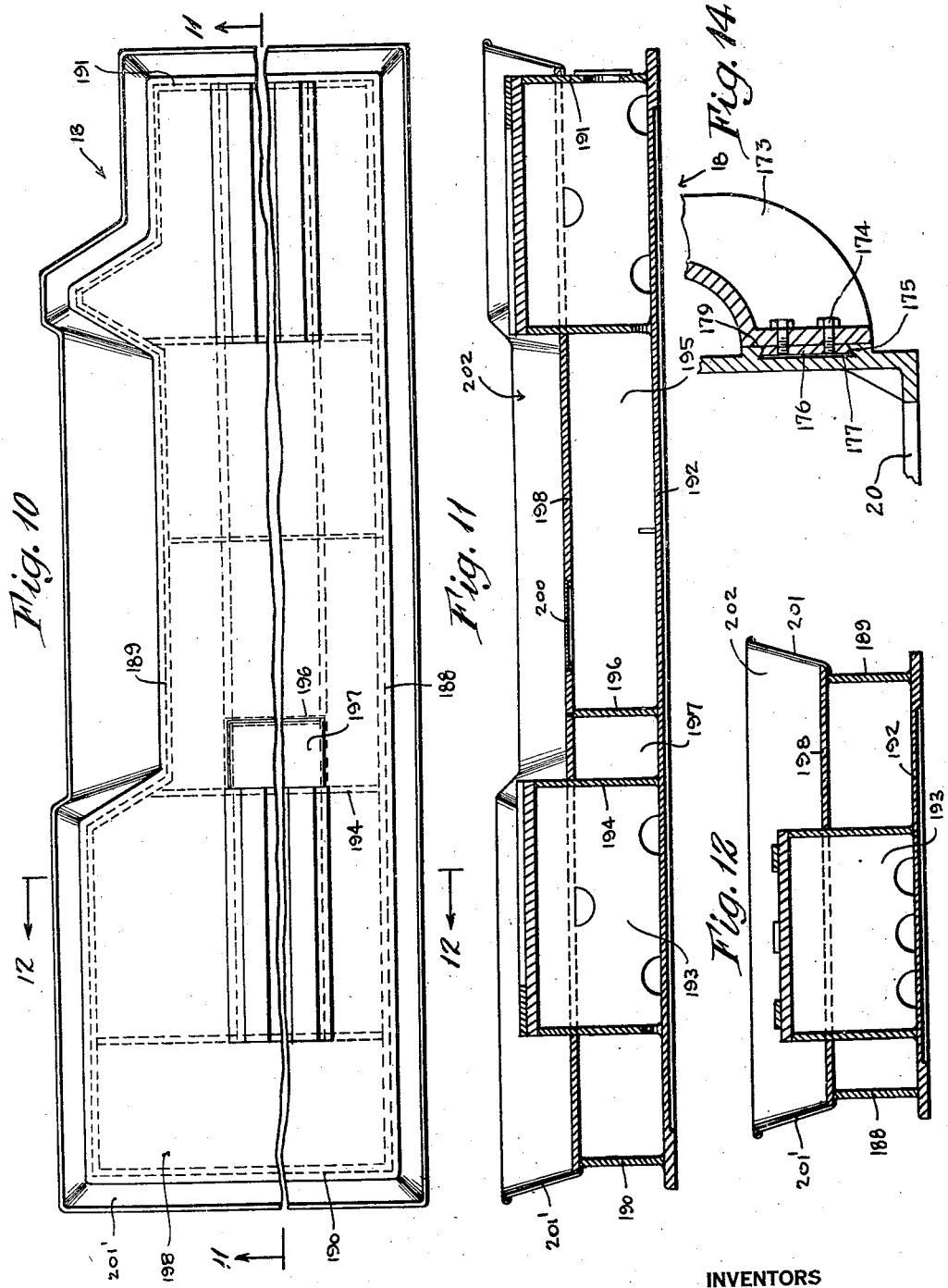

2,389,746

UNITED STATES PATENT OFFICE 2,389,746

LATHE AND METHOD OF MAKING THE SAME

Stanley W. Sparks and Edmund J. Lomazzo, Norwalk, Conn., assignors to The Sparks Machine Tool Corporation, Norwalk, Conn., a corporation of Connecticut Application January 19, 1942, Serial No. 427,334

19 Claims. (Cl. 82—2)

This invention relates to improvements in machines (particularly lathes, such as the multi-tooled production type) and to methods of making the same.

Objects of the present invention are to provide a lathe: capable of extremely heavy cutting loads; capable of automatic and semiautomatic operation, to eliminate many manual moves now normally employed; with hydraulic mechanisms for conditioning and operating various instrumentalities upon the lathe, to insure a smooth, positive interaction of these instrumentalities; the ways of which will withstand wear substantially; with a specially formed gib or gibs to easily and advantageously compensate for any slight wear; with an exceptionally sturdy and efficient tool backslide mechanism; with brake and clutch mechanism which cannot adversely be concurrently rendered operative; with special supports to improve the load which the machine may carry; with easily assembled and removed subunits; with a light yet very sturdy subbase; with oil chambers formed as an integral part of a subbase; with means to prevent hydraulic and cooling fluids from adversely mixing together.

A further object of the present invention is the provision of a simple method for advantageously constructing a subbase for a lathe. Features of the present invention, resulting from the attainment of the above objects, includes 1 through 10 following:

(1) A novel lathe bed way and an adjustable gib structure including an angular arrangement of walls, on the front way of the bed and on the carriage slide, so that wear is distributed over longer and better arranged surfaces therebetween, and so that vibratory strains are absorbed therein and practically eliminated even when heavy multiple tool cuts are being made. This feature also provides a simple method and structure for adjusting the sliding movement between carriage and lathe bed way, prevents the carriage from lifting away from the way and holds the same down tightly. This feature eliminates the use of conventional clamps on the main carriage and eliminates the necessity for a planed surface under the front way of the lathe bed.

(2) A backslide of unusual design is provided, including a very sturdy standard secured at the back of the main bed and projecting upwardly to a point where it is associated with one or more bars extending longitudinally of the machine and where it is connected with a base for the carriage of the backslide. All of these interrelated structures are adapted to support the backslide, and particularly the backslide carriage, entirely clear of the ways of the machine, and also clear of the main carriage which is normally shiftable into various positions longitudinally of the ways and of the main bed. A particularly novel feature of this general structure is the provision of a very sturdy support for the backslide tools at a point very close to the work, yet in a manner that does not impede normal reciprocating movements of the carriage.

(3) This novel hydraulic clutch and brake unit which may advantageously be assembled extraneously of the machine and which may be easily assembled to or removed from the machine, without the aid of special tools or without disturbing the main driving mechanism instrumentalities through the provision of a bell-shaped housing bolted to the headstock and forming a part of the same, and providing a main support for the brake, clutch and sheave mechanism.

(4) A clutch and brake mechanism including the provision of novel interconnecting means whereby the clutch can be rendered operative and inoperative. A complemental feature includes a structure with the aforesaid control mechanism for rendering both the clutch and brake inoperative at the same time.

(5) A brake and clutch associated with hydraulic mechanism for dependent operation in a novel and advantageous manner.

(6) Mechanism for automatically conditioning certain main operating instrumentalities of the machine as certain primary controls are operated. Complemental to this the present invention provides mechanism for: automatically releasing the clutch as the tailstock locking means is operated; automatically applying a brake as the tailstock locking means is more fully opened; rendering the brake inoperative and the clutch operative as the tailstock locking means is moved to the closed position.

(7) Mechanism for sequentially controlling hydraulic mechanisms to sequentially operate a main slide, a cross slide and a backslide, and thereby automatically controlling all tool movements.

(8) Mechanism for sequentially controlling hydraulic mechanisms to sequentially operate a main slide, a cross slide and a backslide, and also a clutch and a brake.

(9) A subbase of built-up welded construction wherein the weight of the same supports the main bed and gives a heavy foundation under the bed within which vibratory strains are absorbed during operation.

(10) A welded-together base including integral fluid chambers. Complemental to this feature, the present invention provides a dead chamber between two live chambers to prevent adverse seepage of unlike fluids between the two live chambers.

Other objects, features and advantages will appear hereinafter.

Figure 1 is a front plan view of the lathe of the present invention.

Fig. 2 is a top plan view of the machine shown in Fig. 1.

Fig. 3 is a headstock end view of the lathe shown in Figs. 1 and 2.

Fig. 4 is a tailstock view thereof.

Fig. 5 is a rear view of the machine.

Fig. 6 is a sectional view taken on line 6—6 of Fig. 8.

Fig. 7 is a fragmentary detail taken on line 7—7 of Fig. 6.

Fig. 8 is a sectional view of the headstock and main driving mechanism taken on line 8—8 of Fig. 3.

Fig. 9 is a diagrammatic view of the hydraulic and control mechanism.

Fig. 10 is a top plan view of the subbase.

Fig. 11 is a sectional view of the subbase taken on line 11—11 of Fig. 10.

Fig. 12 is a sectional view of the subbase taken on line 12—12 of Fig. 10.

Fig. 13 is a detail of the tailstock locking mechanism.

Fig. 13a is a detail sectional view taken on the line 13a—13a of Fig. 13.

Fig. 14 is a fragmentary view of the backslide unit.

Fig. 15 is a detailed sectional view of the gib assembly.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

The drawings disclose one form of the invention, the now preferred form. In order to facilitate an understanding of the detailed description thereof a brief outline of one type of operation, shell-turning, is given.

Operation

The lathe is equipped for automatic operation by the use of hydraulic feeds and hydraulically operated duplex brake and clutch for starting and stopping the spindle. The shell forging is inserted in the lathe, the tailstock live spindle is hydraulically traversed to locate the shell on the expanding mandrel, or other chucking instrumentality, at which time the spindle is automatically started through the hydraulically operated clutch, and the carriage with the slide controlled tools thereon is moved hydraulically until the outside of the shell is completely turned. Simultaneously, the rear slide tools are hydraulically moved into the shell to face the base end and cut-off the open end to length. Upon completion of the turning operation, the pilot valve is automatically rotated by the trip dog, putting the feeds in rapid reverse to return the carriage and rear slide to their respective starting positions. The spindle is automatically stopped through the hydraulically operated brake, and the foot-treadle valves mounted on the floor are operated to release pressure on the expanding mandrel and traverses the tailstock spindle to allow quick recovery of the turned shell.

For convenience, a description of the present embodiment of the machine is given in connection with shell-turning.

It should be understood that backslide tools may be omitted and various other modifications of the above-outlined operation may be made, within the scope of this invention; further, that the machine is adapted to turn-cut automobile, airplane, tank, gun and engine parts, or many parts other than shells.

The lathe comprises a bed (or main frame) 16, preferably in the form of a main base 17 suitably secured to a subbase 18. The main base includes preferably integral front, rear, left side and right side walls 19, 20, 21 and 22 respectively. The rear wall 20 at its top is provided with a main way 23 including inner, outer, top and bottom walls 24, 25, 26 and 27, respectively. Somewhat similarly the front wall 19 of the main base 17 is provided with a compensating way 28 including a bottom wall 29, an inner wall 30, an outer angular wall 31, a flat top wall 32, an inner angular wall 33 and a top angular wall 34 (see Fig. 4). The front, rear and side walls 19, 20, 21 and 22 may be of any suitable thickness and may be extended to the floor, if it is desired to dispense with the subbase 18, as will be readily appreciated by any mechanic. However, for various reasons as is later pointed out in detail, use of the subbase is preferred.

Headstock

At the top, and left-hand side, of the bed (or main frame) 16, as viewed in Figs. 1 and 2, the present invention provides a headstock 35 suitably secured to the main base (as by bolts and straps in the conventional manner). This headstock preferably includes a housing 36, of cast iron or the like, with integral chambers 37 and 38 and with bores 39 and 40, respectively accommodating a main spindle 41 and a main drive shaft 42 with an intermediate bore 43 for an intermediate shaft 44 therebetween. The spindle and drive shafts 41, 42 and 44, respectively, are suitably mounted in the bores 39, 40 and 43, respectively.

The main spindle 41 is provided with a flange 45 against which a flange plate 46 and a roller bearing 47 are held by force and lock nuts 48 and 48', respectively. Thereafter, the spindle 41 may be passed inwardly of the bore 39 (from the right to the left, as viewed in Fig. 8) while the reduced end 49 of the main spindle 41 is passed through a gear 50, dog tooth collar 51, gear 56, spacer sleeve 52 into the position shown in Fig. 8. A roller bearing 53 may then be secured to the reduced section 49 on main spindle 41 as by a nut 54, and the left-hand end of the bore 39 may be suitably sealed by a plate 55 held in place by bolts 55' as shown in Figs. 3 and 8.

The mounting just described in detail provides a very sturdy support for the main spindle 41 so that it will carry and rotate heavy loads without vibration and without end-play. The gears 50 and 56 may rotate on spindle 41, while dog tooth collar 51 is secured against rotation thereon by suitable means such as a spline. The dog tooth collar is provided with peripheral slot 57 accommodating studs 58 on control lever 59 so that the latter may reciprocate the dog tooth collar and teeth 60 and 61 thereon axially, from the neutral or inoperative position shown in Fig. 8, on the main spindle 41 into suitable engagement with teeth 60' on the gear 50 or with teeth 61' on the other gear 56.

Intermediate shaft

An intermediate shaft 44 is suitably supported in the bore 43 of housing 36 as upon bearings 62 and 62' with the inner races thereof suitably secured against shoulders 63 and 63' on the intermediate shaft by nuts 64 and 64' while the outer races thereof are suitably forced into the bore 43. This intermediate shaft 44 between the shoulders 63 and 63' supports driver gears 65 and 66, to mesh with gears 50 and 56, respectively, on the main spindle 41 and also supports driven gears 67 and 68 in mesh with driver gears 69 and 70 on the main drive shaft 42 about to be described. All of the aforesaid gears on the intermediate shaft 44 are held against rotation thereon as by a suitable key and slot connection. Suitable caps 71 and 71' are forced into opposite ends of the bore 43 to further prevent axial shifting of the intermediate shaft, and particularly to prevent escape of lubricant.

The main drive shaft 42, and particularly a clutch mechanism 72 and brake mechanism 73 associated therewith, provide novel and highly efficient features in the present invention and should therefore be particularly noted. The inner end of the main drive shaft 42 is suitably supported in the bore 40 of the housing 36 as by ball bearings 74 and 74' with inner races of the latter suitably secured to reduced sections 75 and 76, respectively, of the main drive shaft and with the outer races thereof suitably forced into the bore 40. A suitable end cap 77 is secured at the inner end of the bore 40 in order to prevent lubricant seepage therethrough while an annular plate 78 with a sealing ring 79 on the main drive shaft 42 is suitably secured to an inner wall 78' of the housing 36 to prevent lubricant seepage into the chamber 38.

Now, of particular importance, after and while the main drive shaft is assembled in the bore 40 as just described, and while the left-hand half of the shaft 42 projects outwardly through the chamber 38, clutch mechanism 72, brake mechanism 73 and sheave 80 may be assembled as a control unit 81 to the housing 36 in order to complete the headstock. This is highly advantageous from an assembly, adjustment and repair standpoint.

This control unit 81 includes the sheave 80 preferably including a plurality of angular slots in the periphery thereof to accommodate a suitable multi-V belt. This sheave is in turn suitably mounted on bearings 82 and 82' for free rotation upon the main drive shaft 42 as may be seen best in Fig. 8. The mounting therefor, now preferred and shown, includes a pair of opposed annular rings 83 and 83' secured to a hub of the sheave 80 by screws 84 which with a nut 85 serve to rotatably mount the sheave upon the drive shaft yet prevent axial movement thereof (cooperating with shoulders 86 and 86'). The sheave 80 is also provided with a clutch ring 87 suitably extending over expanding members 88 of the clutch base member 89 (Fig. 8). This clutch ring may be integral with the sheave 80; or, as shown, may be in the form of a separate ring secured thereto as by screws 87'. The clutch base member 89 is suitably secured to the shaft 42 and and is the well-known and extensively used Model M. T. "Twin disc" clutch, and is therefore not shown in detail. Other suitable and well-known clutch arrangements might be used between the sheave 80 and the main drive shaft 42. The brake mechanism 73 is a similar Model M. T. "Twin disc" clutch. However, it should be particularly noted that this clutch, instead of being cooperable with a sheave, gear, pulley or other rotatable member as is customary, has a gripping section 90 thereof cooperable with a stationary annular brake plate 91 integral with a cap 92; or, in the form of a ring suitably secured thereto as by screws 91'.

Intermediate the clutch and brake mechanisms 72 and 73, respectively, linkage connections 93 and 93' are provided connected to expanding members 88 of the clutch mechanism 72 and to the gripping section 90 of the brake mechanism 73. These linkages, in turn, are operated by bevel surfaces 94 and 94' on a rotatable collar 95 which is shiftable into positions shown by dot-and-dash lines A and B in Fig. 8 by pins 96 on a yoke lever 97 suitably pivoted on the housing 36 (or on the end cap 92). After the control unit is added to the left-hand half of the main drive shaft 42 the cap 92 is secured to the headstock housing 36 as by screws 92', and then gasket 98, ball bearing 99, nut 100 and dust cap 101 are secured to the cap 92 to complete assembly and support of the main drive shaft 42 relative to the headstock housing 36.

When it is desired to make adjustments or repairs to the clutch mechanism 72, sheave 80, brake mechanism 73 or other parts of the control unit, it is merely necessary to remove the dust cap 101, nut 100 and ball bearing 99 from the outermost end of the main drive shaft 42, and then remove the cap 92 from the housing 36 and move the lever 97 into the brake-operating position whereupon the clutch, sheave, brake and control for the clutch and brake may be removed en masse from the chamber 38 of the housing 36.

When the control lever 97 is moved in a clockwise direction as viewed in Fig. 1 it will move the control ring 95 from the neutral position shown in Fig. 8 or from the braking position B into the clutch-operating position A to connect the main drive shaft 42 with the rotatable sheave 80 and thereby effect rotation of the main drive shaft 42 with the sheave 80. When the control ring 95 is moved to the left as viewed in Fig. 8 as by moving the control lever 97 in a counterclockwise direction, it reaches the position B whereupon the linkage 93' expands the gripping section 90 into engagement with the annular brake plate 91 to effectively and quickly stop rotation of the main drive shaft 42 and associated mechanism driven thereby. The clutch and brake structure just described is such that the clutch mechanism 72 is automatically disconnected when the control ring 95 is moved to the braking position, and the brake mechanism 73 is automatically disconnected when the control ring 95 is moved into the clutch-operating position. To further insure proper operation of the clutch and of the brake an intermediate neutral position is provided wherein neither the clutch nor the brake will be operated.

Rotation of the main drive shaft 42 is utilized to effect rotation of the main spindle 41 through the gears previously described within the housing 36. Divers speeds of rotation of the main spindle may be effected even though the main drive shaft is uniformly rotated. For example, and as may be seen best in Figs. 1, 6, 7 and 8, movement of shift lever 102 and rod 103 secured thereto in a clockwise direction causes a pin and slot connection 104 to move lever 105 and yoke 106 in a counterclockwise direction, and causes a dog tooth clutch 107 (having a suitable spline connection) to engage with the larger driver gear 78 on the main drive shaft 42 in order to cause this gear to rotate concurrently with the dog tooth clutch and the main drive shaft. Movement of the same shift lever 102 (and its associated parts just described) in a counterclockwise direction causes the dog tooth clutch to be moved, either from engagement with the large driver gear 70 or from the neutral position shown in Fig. 8, into driving engagement with the smaller driver gear 69.

Somewhat similarly, clockwise movement of lever 108 and sleeve 109 (Figs. 1, 6, 7 and 8) effects a clockwise arcuate movement of a yoke 110 which in turn moves a dog tooth clutch 111 on the main spindle 41 in a right-hand direction as viewed in Fig. 8 from the neutral position shown therein into engagement with the larger driven gear 50 on the main spindle 41. Conversely when the same lever 108 and sleeve 109 are arcuately moved in a counterclockwise direction as viewed in Fig. 1 the dog tooth clutch 111 is moved from engagement with the larger driven gear 50 or from the neutral position shown in Fig. 8 into operative and driving engagement with the smaller driven gear 56 on the main spindle 41. Four different speeds of the main spindle may thus be effected without altering the speed of the main drive shaft; to wit:

I. Main drive spindle 41, to dog tooth clutch 111, to smaller driven gear 56, to driver gear 68 on intermediate shaft 44, through intermediate shaft 44, to smaller driven gear 68 on intermediate shaft 44, through meshing large driver gear 70 on main drive shaft 42, thence to the dog tooth clutch 107 on the main drive shaft 42, to effect one speed of rotation of the main spindle.

II. Primarily shifting (from the I line-up) dog tooth clutch 111 from engagement with small driven gear 56 on the main spindle 41 to the large driven gear 50 on the main spindle to effect a slower speed of the main spindle.

III. A third speed is effected by manipulating the levers 102, rod 103, yoke 106 and associated dog tooth clutch 107 (the latter into engagement with gear 69) so that a driving connection extends between main drive shaft 42, clutch 107, driver gear 69 on main drive shaft 44, driven gear 67, intermediate shaft 44, small driver gear 65 on intermediate shaft 44, large driven gear 50 on main spindle 41, dog tooth clutch 107 and main spindle 41.

IV. The fourth speed is achieved by allowing lever 102 to remain in the III position and merely shifting the lever 108 to move the dog tooth clutch 111 from engagement with the large driven gear 50 into engagement with the small driven gear 56 on the main spindle.

Drive

Any suitable prime mover may be connected to sheave 80 to effect rotation thereof and operation of the machine. To facilitate a consideration of the present invention an electric motor 112 is secured to the top of the headstock 35 as by bolts. It may be provided with a suitable multi-V belt extending from a suitable pulley thereon downwardly through the housing or shield 113 over the sheave 80.

The cap 92 alone may be removed from the headstock housing 36 (or, together with the brake mechanism 73 and clutch mechanism 72 less the sheave 80) to facilitate placing a suitable belt over the sheave 80 for connection to the motor 112 at the top of the machine (or to the main drive shaft or the like).

Tailstock

As may be seen best in Figs. 1, 2, 4 and 5, the present invention provides a tailstock 114 including a housing 115 suitably located upon and fixed to ways 23 and 28 of the main base 17; for example, by the provision of inverted L-shaped walls 116 and 116' at one side thereof engaging inner and top walls 24 and 25, respectively, of the main way 23, and similar inverted L-shaped walls 117 and 117' at the opposite side thereof engaging inner and top walls 30 and 32 of the compensating way 28 with the entire tailstock in turn being bolted in any desired position longitudinally of the ways as by a plate 118 clampable against the underside of said ways 23 and 28 as by tightening nuts 119 of bolts 120 which extend from the underside of said plates 118 upwardly through the tailstock and above the top thereof. The tailstock housing is in turn provided with a large bore 121 adapted to reciprocably receive a large feather 122. At its inner end the feather may be provided with a conventional live center 123 or any other suitable device, whereas at its outer end the feather, in accordance with the present invention, is connected to a rod 124 and a piston 125 of a hydraulic cylinder 126 for two-way reciprocation. As shown in Fig. 13, the tailstock feather 122 is clamped by arcuately moving an eccentric rod 127 within a bore 128 of a friction sleeve 129 mounted in a large cavity 129a in the tailstock as by swinging a tailstock clamping lever 130. As this lever is moved in a clockwise direction as viewed in Fig. 2, it causes the eccentric rod 127 to move a concave wall 131 on the friction sleeve against the side of the feather 122 to sturdily grip or lock the feather relative to the bore 128 of the tailstock housing 115. Release thereof is effected by primarily moving the tailstock clamping member 130 in a reverse or counterclockwise direction.

Carriage

A carriage 132 of the present invention includes a substantially T-shaped member (inverted with respect to a person facing the front of the machine) with a transverse section 133 thereof spanning the main base 17 between the compensating way 28 and the main way 23. The same transverse section has a substantially C-shaped end 134 hooking onto the main way 23; whereas, a longitudinal section 135 of the carriage 132 in the main rests upon the compensating way 28, as may be seen best in Fig. 4. For this purpose the carriage is provided with a main-way channel 136 defined by walls 137, 138 and 139, and the longitudinal section 135 thereof is provided with a compensating channel 140 including walls 141, 142, 143 and 144. The abrupt angular wall 142 is adapted to resist direct outward pressure resulting from the turn-cutting tools engaging work in the machine; whereas, walls 141 and 143 are substantially wide and substantially flat to resist downward pressure resulting from turn-cutting work.

To compensate for wear and to insure a snug fit at all times between the compensating-way channel 140 and the compensating way 28, the present invention provides a novel gib 145 fitting within a channel 146 of the carriage 132 held in place therein as by tightening bolts 147 at the top of the longitudinal section 135 and drawing the gib 145 toward the top and inner part of the channel 146. Longitudinal movement of the carriage 132 may be limited by any suitable stops. As shown in Figs. 1 and 2 such stops may include screw rods 148 secured to the carriage 132 and extending longitudinally of the compensating way 28 to a split C-shaped block 149 clamped to the compensating way as by bolts 150. Nuts 151 at the outer end of the rods 148 limit movement of the carriage toward the headstock 35, whereas nuts 152 at the inner side of the rods 148 limit movement of the carriage toward the tailstock 114.

Cross slide

A cross slide 153 is provided directly upon the main carriage 132 and includes a base member 154 having a dovetail connection 155 therebetween as may be seen best in Figs. 1, 2 and 4 (cross slide stop). Movement of the cross slide 153 into the most advanced position desired and into the most retracted position desired is effected or governed by a rod 156 having a suitable screw thread or like connection to the cross slide 153 and to a two-way piston of a conventional two-way hydraulic cylinder 158. The latter is supported upon the carriage 132 as by a supporting plate 159 suitably bolted or otherwise suitably secured to the carriage 132 (Figs. 1 and 2).

To stop the cross slide carriage 153 in its movement inwardly and outwardly relative to the headstock 35 and tailstock 114, the present invention provides a pair of rods 160 suitably secured to the cross slide 153, as by being screwed directly therein, with nuts 161 at the outer edge thereof adapted to engage one face of plate 159, and nuts 162 at the inner section of the rods 160 adapted to engage the opposite face of the plate 159.

One or more tool holders 163 may be mounted upon the cross slide 153 as by tightening bolts 164 extending to T blocks 165 in T slots 165.

Backslide unit

With certain operations or with certain types of work it is desirable to effect cuts beyond those obtainable with the main carriage and cross slide tools. To this end, the present invention provides a very sturdy backslide unit 167 including a main base 168 supporting a slide 169 for movement from the back of the machine toward the center of the lathe. To make this movement possible the main base and slide are provided with an interconnecting dovetail connection 170 transversely of the machine, as may be seen best in Figs. 2, 4 and 5. Supplementing the dovetail connection, too, the present invention provides a pair of tongue and groove connections 171 and 172, one at each side of the main base and slide (Figs. 2 and 5).

Now it should be particularly noted that said backslide main base 168 and tool slide 169 are sturdily supported entirely clear of the top of the ways of the machine. To this end the main base 17 has a vertical standard 173, preferably integral therewith, which may be secured to the rear wall 20 of the main base 17 as by bolts 174; or may be secured to the main base in divers positions longitudinally thereof as by the provision of a suitable dovetail connection 175 between the vertical standard 173 and the rear wall 20 of the main base 17, as shown in Fig. 14. This adjustable dovetail connection 175 in its present preferred form includes a plate 176 of fantail cross section slidable within a corresponding slot 177 extending longitudinally of the rear wall 20 with bolts 174 extending between the vertical standard 173 and the plate 176 in such a manner as to concurrently tighten the flaring walls of the plate 176 against the converging walls of the slot 177 simultaneously with the clamping of wall 178 of the vertical standard 173 against face 179 of the rear wall 20. With the latter mechanism it is possible to set the backslide unit into divers positions longitudinally of the machine so that the slide 169 thereof may be close to the headstock 35 for short work and remote therefrom for long work.

Also, of particular importance, to further support the backslide unit and to thereby make possible very heavy cuts and cuts without chattering, the present invention provides supplemental supports for the backslide unit including at least one and preferably two bars 180 and 181 suitably secured to the headstock 35, as by being forced therein (see Fig. 2), and slidably extending through suitable split bores 182 and 183 in the main base 168 for the backslide unit 167 and split bores 184 and 185 in the tailstock 114, said split bores 182 and 183 being tightened upon the rods 180 and 181 by bolts 186 so that the bars 180 and 181 rigidly support the backslide unit relative to the headstock 35 and tailstock 114. Similarly, split bores 184 and 185 of the tailstock 114 may be clamped to the bars 180 and 181 as by tightening bolts 186' (see Figs. 4 and 5).

Subbase

As pointed out at the outset, the main base 17 can have the walls 19, 20, 21 and 22 extending directly to the floor, as is customary in many lathes heretofore proposed. However, the present invention provides a novel subbase 18 having several advantageous features. This subbase includes a substantially rectangular main frame with front, rear and end walls 188, 189, 190 and 191 upon a bottom plate 192 defining a large chamber which in turn is divided into a hydraulic fluid chamber 193 by an intermediate wall 194 and into a coolant chamber 195 defined by a second intermediate wall 196. Preferably, and as shown, these intermediate walls are spaced from each other to provide a dead chamber 197 so that if fluid leaks from either chamber 193 or 195 it cannot adversely enter or mix with fluid in the other of said chambers. Preferably, the subbase is made by forming individual plates or strips into the desired configuration of the bottom plate 192, front, rear and side walls 188, 189, 190 and 191, plus forming intermediate walls 194 and 196 of the proper configuration; and, thereafter welding all of the foregoing together into the shape shown.

The main base 17 may be set directly upon the subbase 18 just described as by screws, or suitably secured thereto. However, in order to make the subbase straight and to prevent an adverse accumulation of chips in any of the chambers 193, 195 or 197, the present invention provides a top plate 198 preferably large enough to span all three of said chambers and to preferably project a slight extent beyond the walls 188, 189, 190 or 191. This top plate is preferably formed in the same manner as the other plates of the subbase and is preferably welded to the side walls and bottom plates after a complete assembly and welding of the latter. If preferred, the subbase may be in the form of a one-piece casting with the chambers formed by suitable coring. The top plate is preferably provided with one or more openings 200 which may have grills therein to allow return of coolant to the chamber 195, and yet exclude chips therefrom. It may also be provided with an integral upstanding flange 201 entirely about the periphery thereof to form, with the top plate 198, a chamber 202 for retaining chips. However, for economy and as disclosed here, a thin sheet metal strip 201' is secured thereto as by welding. The main base 17 may be suitably bolted to the top plate 198 of the subbase 18, as will be readily appreciated.

A simple method is employed in making said subbase, including the simple steps of cutting and/or forming the aforementioned plates to the desired size, and welding said plates together to form the subbase.

Hydraulic operating units

To insure a smooth, powerful and coordinate movement of the various instrumentalities in the present lathe, the invention provides a plurality of hydraulic units, to wit: The tailstock feather 122 is moved to and from work by a hydraulic piston 125 and cylinder 126 connected to the feather 122 as by a rod 124. When fluid is admitted to the cylinder as through a port 203 the feather 122 and the live center (or the like) are projected toward the headstock 35 to grip any work supported by the headstock or to assist the latter in holding work, whereas when fluid is admitted to the cylinder 126 through port 204 it forces the piston 126 in an opposite direction to move the feather and center away from the headstock, for example to unload the machine.

A conventional expanding chuck 205 on the main spindle 41 is also operated by a piston 206 in a cylinder 207 at the left-hand side of the machine, as viewed in Figs. 1 and 2, said piston projecting a rod 208 in one direction in order to conventionally operate a chuck, collet or the like, at the other end of the main spindle, to render the same operative; said piston in turn pulling or operating the rod 208 in another direction to render the chuck, collet or the like inoperative in the usual way.

A two-way piston and cylinder 209 at the rear and under side of the headstock 35 (see Fig. 1) is adapted to oscillate a control lever 97 in two directions in order to operate the clutch and/or brake.

Longitudinal movement of the main carriage 132 along the main and compensating ways 23 and 28 is accomplished by a two-way piston and cylinder 211 secured to the front of the machine, as may be seen best in Fig. 1, said standard two-way piston and cylinder having a direct connection with the carriage 132 as by a rod 212. Movement of the main cross slide 153 toward and from work supported by the main spindle 41 and/or by the tailstock 114 is effected by standard two-way piston and cylinder 158 suitably secured to the front of the carriage 132 as by a plate 159, and having a connection through rod 156 with the base 154 of the cross slide 153. A standard two-way piston and cylinder unit 214 is secured to the rear of the back slide unit 167 and is provided with a suitable rod connection 215 directly to the slide 169 of the back slide unit 167 as may be seen best in Figs. 2 and 4.

Although the aforesaid pistons and cylinders may be standard units, use is made thereof in a novel manner with certain of the instrumentalities, and particularly novel combination or interdependent use is made thereof, with a novel circuit and controls. Relationship of these various hydraulic instrumentalities with other parts of the machine and the circuit therefor are diagrammatically illustrated in Fig. 9 and will now be described in detail.

Description of circuit diagram—Fig. 9

The function of a novel circuit 216, of the present invention, is to provide an arrangement of means for hydraulic actuation of the lathe of the present invention, for example in turning shells, according to a prescribed cycle. The cycle includes a loading phase during which the operator loads the shell into the lathe and manipulates controls for its proper location and support, a clamping phase in which the lathe tailstock 114 is manually clamped in position and the clutch 72 is automatically engaged, a starting phase in which an automatic sequence of events is manually initiated, a positioning phase during which the turning tools are automatically and predeterminedly moved into working position, a working phase in which the tool carriage 132 is fed longitudinally while the turning tools remove stock from the shell or the like, a second working phase wherein a tool on the cross slide 153 is fed inwardly for facing the end of the shell, a reversal phase in which the cross slide 153 is returned to its initial position at a rapid traverse rate, a second reversal phase wherein the turning tools are brought back from the work at a rapid traverse rate (before, with or after return traverse, as preferred), a third reversal phase for returning the tool carriage 132, an unclamping and declutching phase, and an unloading phase. A conventional cam plate may be used with the cross slide 153 for contour turning of work. The particular sequence and also the start and top of the operation of each phase may be altered as will be appreciated, without departing from the scope of the invention.

During the machining phases of the cycle, the shell, or the like, may be held in position and driven by the hydraulically actuated, internal, expanding three-jaw Cushman chuck 205 associated with driving and rotating elements of the lathe headstock 35, and the nose end of the shell is axially located and supported by a live center 123 in the tailstock 114. When a shell is loaded into the lathe, the open end of the shell is positioned over the jaws of the chuck 205 and the live center 123 of the tailstock 114 is hydraulically brought into contact with the nose of the shell. Subsequently, the chuck 205 is hydraulically expanded so that the chuck jaws make driving contact with the bore of the shell. The tailstock 114 is then manually clamped and engagement of the spindle clutch 72 is effected simultaneously so that rotation of the shell and sequential operation of the tools and slides is begun in response to the clamping action.

The hydraulic cylinders, check valves, four-way units, flow regulators, etc., are conventional and are, therefore, not shown in detail. However, the particular combination thereof disclosed by the present invention is novel and highly advantageous. Use thereof insures the proper completion of all the required operations on the work, increases output and greatly reduces the number of moves and work normally imposed upon the operator.

To accomplish the loading operation, the operator places the shell with its open end over the jaws of the Cushman chuck 205 or other holding device and depresses the right side of the foot treadle 217 of valve 218 to move the valve stem to its extreme "out" position. At this time, fluid from a pump 219 is available through line 231 and pressure-reducing valve 220 with an input pressure equal to that of the setting of the relief valve 221. The shifting of the conventional spool in conventional valve 218 to its extreme "out" position, causes fluid (at the pressure determined by the setting of pressure-reducing valve 220) to flow through the ports of valve 218 into line 222, through sequence and check valve 223, and line 224 to the head end of the tailstock cylinder 126. This causes the piston 125 of the tailstock cylinder 126 to move to the left and bring the live center 123 of the tailstock 114 into engagement with the nose of the shell. Leftward movement of this piston is arrested when the open end of the shell is forced against shoulders on the Cushman chuck 205 or other work-positioning stop. The arrest of this movement causes a slight rise of pressure on the fluid passing through sequence and check valve 223, and the spool of this valve is caused to shift so that fluid from line 222 flows into line 225, whence it passes through pressure-reducing valve 226 into line 227 and moves the piston 206 for the Cushman chuck 205 to the right. The rightward movement of this piston expands the jaws of the chuck 205 so that they make driving contact with the bore of the shell.

The operator then proceeds to clamp the tailstock 114 in position by manipulation of the tailstock clamp lever 130. A cam surface 228 that rotates in connection with the tailstock clamp lever 130 is thereby caused to actuate a plunger 229 of pilot valve 230, which is supplied with fluid from lines 231 and 232. Pressure is thus directed through the ports of the pilot valve 230 into line 233 to the head end of the spindle clutch cylinder 209'. As a result, the spindle clutch piston 209 is caused to move to the left and engage the spindle clutch 87' so that drive is transmitted to the Cushman chuck 205 and rotation of the shell is begun. Simultaneously with full clutch engagement, pressure in line 233 rises and, acting through line 234, causes the spool of valve 235 to be so displaced that fluid for actuation of the feed cylinders is made available at line 236.

To begin the automatic phases of the cycle, the operator positions the handle of pilot valve 237 to the start position so as to direct pilot pressure (which is available through line 238) into line 239. Pressure supplied to line 239 is effective upon the pilot control end of valve 218 through line 20 in such a manner that the valve spool is restrained from movement. It is thus impossible for the operator to actuate the foot treadle 217 of valve 218 to cause an opening of the chuck 205 and a displacement of the live center 123, and the shell is retained in machining position throughout the work phases of the cycle. Fluid from line 239 acts on the left end of valve 241 for shifting the spool so that fluid from line 236 (then at sufficiently high pressure to force the opening of sequence valve 242) and line 243 flows through ports of valve 241 into lines 244 and 245.

The initial effect of fluid flow in line 244 is to flow into the head end of the cross slide cylinder 158 through line 245, which displaces the piston 157 inwardly and causes the tools to be moved inwardly against positive stops 161. The rate at which the tools are moved inwardly is controlled by the regulation of the flow of exhaust oil from the rod end of the cylinder 158, the passage being through line 246, flow control valve 247, and lines 248 and 250 to the tank 193. The rate of flow is controlled, of course, independent of inlet and outlet pressure to conform with a preselected dial setting on control valve 247.

The quantity of fluid entering lines 244 and 245 is more than sufficient to accommodate the rate of cross slide piston 157 travel, so a portion of the fluid passes into the rod end of the carriage cylinder 211' and displaces the piston 211 to the left and the tool carriage 132 is thereby provided with longitudinal feed along the shell. The feed rate is governed by the rate of exhaust of oil from the head end of the carriage cylinder 211'. The exhaust oil passes through line 251, feed control regulator 252, line 253, free flow check valve 254, lines 255 and 256 entering a port of valve 241 and lines 249 and 250 into the tank 193. As the carriage 132 is fed to the left the tools begin work on the shell, their position of contact with the shell being governed by the maintenance of pressure against the head end of the cross slide piston 157 until the tools thereon are limited in their forward movement by the stops 161. (The stop 161 and cross slide 153 may be so arranged conventionally that one tool in the gang follows a contour equivalent to that of the boat-tail on the shell nose while the balance of the tools follow the contour of the body of the shell.)

At a preselected point in the leftward movement of the carriage 132, detent 257 contacts the lever 257' of pilot valve 258 and rotates the valve spool so that pilot pressure is redirected and the flow is through a conventional port into line 259. Thus, a shift of the spool of four-way 260 is effected. This results in fluid from line 261 passing through ports of four-way 260, and line 262 into the head end of the back slide cylinder 214'. The piston 214 of the rear cross slide cylinder 214' is thus caused to move inwardly and bring the back tools of the back slide 169 into contact with the shell for machining the same. The rate of feed is, in this case, also regulated by control of the egress of oil from the rod side of the cylinder 214'. The flow is through line 263, flow regulator 264 and lines 265 and 250 into the tank 193. The back and front turning operations are continued simultaneously until detent 267 contacts the lever of pilot valve 237 and rotates the handle to the position shown. Under these conditions, the pilot valve 237 is rotated so that pressure from line 238 is redirected so as to flow through the port leading to line 268. The readjustment causes the spool of valve 241 to be shifted so that pressure from line 243 is redirected for flow through ports into lines 256 and 255. Fluid from line 255 flows through sequence valve 269, line 270, free flow check 271 and line 246 into the rod end of the cross slide cylinder 158 whence the tools are moved rapidly outwardly from the work and fluid from the head end of the cross slide cylinder 158 is exhausted into lines 245 and 244, through ports of valve 241, into lines 249 and 250 to tank 193. During this interval, the carriage 132 stops momentarily until such time as the cross slide piston 157 reaches the end of the stroke and pressure in line 255 rises sufficiently to shift the spool of sequence valve 269 for flow from line 255 into lines 272 and 273.

When this sequence is taking place, fluid from line 272 flows through free flow check valve 274 and line 251 to the head end of the carriage cylinder 211' for displacing the carriage piston 211 to the right. Fluid from the rod end of the carriage cylinder 211' is then exhausted into line 244 and through valve 241 into lines 249 and 250 for return to tank 193.

Detent 276 is thus caused to contact the lever 276' of pilot valve 258 and rotate its spool so that the port leading to line 259 is connected to the tank port and pressure is available through ports to line 277. Pressure from line 277 shifts the spool of four-way 260 so that pressure is redirected from line 261 through the ports of four-way 260 into line 278, whence it flows through free flow check valve 279 into lines 280 and 263 and the rod end of the (rear) cross slide cylinder 214' for outward displacement of the piston 214 and attendant removal of the rear tools from the work at rapid traverse rate. Fluid from the head end of the cross slide cylinder 214' is returned to tank 193 through line 262, the port of four-way 260 and lines 266 and 250.

Subsequently, during the return travel of the carriage 132 cam 281 depresses the plunger of unloading valve 282 so that the pump output is returned to tank 193 through line 282' and 250. The pump 219 is thus unloaded to the pressure setting of sequence valve 269 and the carriage return movement is stopped.

The operator next manipulates the tailstock clamp lever 130 for unclamping the tailstock 114. Simultaneously, the cam 228 is removed from the plunger of pilot valve 230 and the plunger is spring-returned to its original position. Fluid from line 232 is thus directed through a conventional port and line 283 to the rod end of the spindle clutch cylinder 209' and the piston 209 is displaced to the right so that the clutch 87' is disengaged. The fluid from the head end of the spindle clutch cylinder 209' is exhausted into line 233 and through ports of valve 230 into line 265 whence it passes to tank 193 through lines 265 and 250.

The operator then depresses the left foot pedal on valve 218 to shift the valve spool so that pressure is directed through the port leading into lines 284, 285 and 286. Fluid from line 285 enters the tailstock cylinder 126 at the rod end and causes the piston 125 to move to the right, thereby withdrawing the tailstock live center 123 from the nose of the shell. Fluid flowing in line 286 enters the rod end of the Cushman chuck cylinder 207 and displaces the piston 206 to the left so that the jaws of the chuck 205 are contracted when the operator removes the shell from the lathe.

The rear cross slide may be provided with stops 308 to limit advanced and retracted movement, like those provided for the front cross slide unit, as will be readily appreciated.

For the sake of clarity all valve drain lines have been omitted, it being understood that these lines all lead to the tank 193 in the conventional manner.

Variations and modifications may be made within the scope of this invention and portions of the improvements may be used without others.

Having thus described the invention what is claimed as new is:

1. In a lathe, the combination of a bed; a headstock having a spindle and driving mechanism therefor; a clutch in said driving mechanism for controlling the operation of the headstock spindle; a tailstock quill for engaging work supported by the headstock; locking means for securing said tailstock quill in operative position with respect to the work; means for actuating said clutch; control means for said last-named means; and means operatively connecting said locking means and said control means for operating the clutch-actuating means whereby the clutch is operated in response to actuation of said locking means.

2. In a lathe, the combination of a bed; headstock having a spindle and driving mechanism therefor; a brake in said driving mechanism for controlling the operation of the headstock spindle; a tailstock quill for engaging work supported by the headstock; locking means for securing said tailstock quill in operative position with respect to the work; means for actuating said brake; control means for said last-named means; and means operatively connecting said locking means and said control means for operating the brake-actuating means whereby the brake is operated in response to actuation of said locking means.

3. In a lathe, the combination of a bed; a headstock having a spindle and driving mechanism therefor; a clutch and brake in said driving mechanism for controlling the operation of the headstock spindle; a tailstock quill for engaging work supported by the headstock; locking means for securing said tailstock quill in operative position with respect to the work; common means for actuating said clutch and brake; control means for said last-named means; and means operatively connecting said locking means and said control means for operating the clutch and brake-actuating means whereby the clutch and brake are operated in response to actuation of said locking means.

4. In a lathe, the combination of a bed; a headstock having a spindle provided with work-holding mean; a driving mechanism for said spindle; a clutch and brake in said driving mechanism for controlling the operation of the headstock spindle; a tailstock quill for engaging work supported by the work holder; locking means for said tailstock quill; hydraulic means for sequentially releasing said brake and closing said clutch when moved in one direction and for sequentially opening said clutch and then rendering the brake operative when moving in the other direction; and means operated in response to actuation of the quill locking means for controlling movement of said hydraulic means according to the direction of actuation of said locking means for rendering said clutch and brake operative to control the actuation of the headstock spindle.

5. In a multitooled production lathe, the combination of a bed; a headstock; a tailstock; a movable tailstock quill; locking means for said quill; a work holder having work engaging and disengaging conditions; tool slides; a main carriage; a hydraulic system for operating said work holder, tailstock quill, tool slides and main carriage; control means for said hydraulic system; and foot treadle and tailstock quill locking lever means respectively connected to said control means for completely controlling said hydraulic system, said foot treadle means being operable to control movement of said quill, and said locking lever means being operable to control a conditioning of said hydraulic system for operating said slides and main carriage, said control means including a fluid pressure controlled member for controlling automatic operation of said work holder.

6. In a multitooled production lathe, the combination of a bed; a headstock; a tailstock; a movable tailstock quill; locking means for said quill; a work holder having work engaging and disengaging conditions; tool slides; a main carriage; a backslide; a hydraulic system for operating said work holder, tailstock quill, tool slides, backslide and main carriage; control means for said hydraulic system; and foot treadle and tailstock quill locking lever means respectively connected to said control means for completely controlling said hydraulic system, said foot treadle means being operable to control movement of said quill, and said locking lever means being operable to control a conditioning of said hydraulic system for operating said slides and main carriage, said control means including a fluid pressure controlled member for controlling automatic operation of said work holder.

7. In a multitooled production lathe, the combination of a bed; ways on said bed; a headstock; a tailstock; a backslide unit; means slidably supporting said backslide unit on the bed for rectilinear movement both longitudinally and transversely relative to the bed entirely free from said ways thereof; and at least one stationary supporting bar directly associated with said headstock, tailstock and backslide unit and forming an additional support for said backslide unit.

8. In a multitooled production lathe, the combination of a bed; a headstock; a tailstock; a backslide unit; means mounted on the bed slidably supporting said backslide for rectilinear movement both longitudinally and transversely relative to the bed; at least one fixed supporting bar associated with said headstock, tailstock and backslide unit and forming an additional supporting means for the backslide unit; and means for locking said backslide unit and said tailstock to said supporting bar.

9. In a multitooled production lathe, the combination of a bed; a headstock; a tailstock; a clutch; a brake; a main spindle; a quill; a work holder; driving mechanism for said main spindle; a tool slide; a main carriage; a backslide unit; hydraulic means for operating said quill, clutch, brake, work holder, main carriage, tool slide and back slide unit; foot-operated control means in said hydraulic means for sequentially conditioning said quill and said work holder; hand-operated means adapted to lock and unlock the quill; and control means in said hydraulic means, operatively connected to said hand-operated means, adapted to control the brake, clutch, driving mechanism, tool slide, backslide unit and main carriage on operation of said hand operated means.

10. In a lathe, work-supporting means having driving mechanism therefore; a clutch in the driving mechanism; a tailstock quill movable into and out of engagement with the work; locking means for the tailstock quill for locking the quill in work-engaging position, said locking means having an operating member movable into locking and unlocking positions; power means including a hydraulically actuated member for engaging and disengaging said clutch; control means for said power means; and means responsive to operation of the operating member for conditioning said control means to cause said power means to engage and disengage said clutch upon movement of the operating member into and out of said locking positions.

11. In a lathe, work-supporting means having driving mechanism therefor; a brake in the driving mechanism; a tailstock quill movable into and out of engagement with the work; locking means for the tailstock quill for locking the quill in work-engaging position, said locking means having an operating member movable into locking and unlocking positions; power means including a hydraulically actuated member for disengaging and engaging said brake; control means for the power means; and means responsive to the operation of the operating member for conditioning said control means to cause the power means to disengage and engage the brake upon movement of the operating member into and out of said locking positions.

12. In a lathe having driving mechanism, a clutch and a brake in said driving mechanism, a tailstock quill, and locking means for said tailstock quill, said locking means having an operating member movable into locking and unlocking positions, the combination of power means including a hydraulically actuated member for sequentially engaging said clutch and disengaging said brake and for sequentially disengaging said clutch and engaging said brake; control means for said power means; and means operatively connecting said control means and said locking means, including a movable member in said control means and a camlike portion movable with said operating member and engageable with said movable member, for conditioning said control means to cause the power means to sequentially engage said clutch and disengage said brake when the operating member is moved to said locking position and to sequentially disengage said clutch and engage said brake when the operating member is moved away from said locking position toward said unlocking position.

13. In a lathe having driving mechanism, a clutch in the driving mechanism, a tailstock quill, locking means for said tailstock quill, said locking means having an operating member movable into locking and unlocking positions, and movable tool-carrying means, the combination of a first hydraulically actuated means for moving said tool-carrying means; a second hydraulically actuated means for engaging and disengaging said clutch; a hydraulic system for supplying fluid under pressure to said hydraulically actuated means; control means for said second hydraulically actuated means, operatively intermediate the latter and said hydraulic system; means operatively connecting said control means and said locking means, for conditioning said control means to cause fluid from said hydraulic system to cause engagement and disengagement of said clutch upon movement of said operating member into and out of said locking position; and pressure controlled means in said hydraulic system, operable upon engagement of said clutch, for conditioning the hydraulic system to supply fluid under pressure to said first hydraulically actuated means.

14. In a lathe with a work holder having operative and inoperative positions, a movable tailstock quill having operable and inoperable work-holding positions relative to said work holder, locking means for said quill, having locking and unlocking positions, driving mechanism, a clutch in said driving mechanism, tool slides and a main carriage, the combination of hydraulically actuated means for operating said tailstock quill, work holder, clutch, tool slides and main carriage; a hydraulic system for supplying fluid under pressure to said hydraulically actuated means; control means for controlling the flow of fluid from said system to move said tailstock quill to an operable work-holding position; pressure controlled means in said system, operable upon movement of said quill to an operable work-holding position, for controlling fluid to work holder-actuating means; control means for said clutch-actuating means; means operatively connecting said last-named control means and said quill-locking means, operable to actuate said clutch upon movement of said locking means into and out of said locking position; and pressure controlled means in said hydraulic system, operable upon engagement of said clutch, for conditioning said hydraulic system to supply fluid under pressure to said actuating means for said tool slides and main carriage.

15. In a lathe, a headstock having a rotatable spindle provided with a work holding means; drive mechanism for said spindle; a tailstock having a live-center-carrying quill movable into and out of operative position with respect to the work; hydraulic means for moving the quill and actuating the work holding means; and manually operable means for initiating operation of said hydraulic means, the arresting of the movement of said quill by engagement with the work building up a pressure in the hydraulic means and automatically actuating the work holding means.

16. In a lathe, a headstock having a rotatable spindle provided with a work holding means; drive mechanism for said spindle; a tailstock having a quill movable into and out of operative position with respect to the work; hydraulic means for moving the quill and actuating the work holding means; manually operable means for controlling said hydraulic means; manually operable means for locking the quill in position; and means responsive to the actuation of the locking means for controlling the operation of the driving mechanism.

17. A lathe having a headstock having a rotatable spindle provided with a work holding means, drive mechanism for said spindle, a tailstock having a quill movable into and out of operative position with respect to the work, a carriage, and tool slides; hydraulic means for moving the quill and actuating the work holding means; manually operable means for controlling said hydraulic means; manually operable means for locking the quill in position; second hydraulic means for sequentially actuating the drive mechanism, carriage and tool slides; and means responsive to the actuation of the locking means for controlling the operation of the second hydraulic means.

18. In a lathe, a headstock having a rotatable spindle provided with a work holding means; drive mechanism for said spindle; a tailstock having a live-center-carrying quill movable into and out of operative position with respect to the work; hydraulic means for sequentially moving the quill into work supporting position and actuating the work holding means; a carriage having a tool slide thereon, hydraulic means for operating the drive mechanism, carriage and tool slide through a predetermined cycle; manually operable means for initiating said first hydraulic means; manually operable means for locking the quill in position; and means responsive to the actuation of the locking means for initiating operation of the second hydraulic means for sequentially controlling the operation of the driving mechanism, carriage and tool slide.

19. In a lathe, a headstock having a rotatable spindle provided with a work holding means; drive mechanism for said spindle; a tailstock having a live-center-carrying quill movable into and out of operative position with respect to the work; hydraulic means for sequentially moving the quill into work supporting position and actuating the work holding means; a carriage having a tool slide thereon, hydraulic means for operating the drive mechanism, carriage and tool slide through a predetermined cycle; manually operable means for initiating said first hydraulic means; manually operable means for locking the quill in position; means responsive to the actuation of the locking means for initiating operation of the second hydraulic means for sequentially controlling the operation of the driving mechanism, carriage and tool slide; and means for limiting movement of the carriage and tool slide and for reversing the operation thereof; said second hydraulic means including means for increasing the speed of the carriage and tool slide during return to normal position.

STANLEY W. SPARKS.
EDMUND J. LOMAZZO.